United States Patent
Akagi et al.

(10) Patent No.: US 8,089,829 B2
(45) Date of Patent: Jan. 3, 2012

(54) THERMALLY ASSISTED RECORDING MEDIA AND SYSTEM

(75) Inventors: Fumiko Akagi, Fuchu (JP); Masukazu Igarashi, Kawagoe (JP); Hiroaki Nemoto, Odawara (JP); Takayuki Ichihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 93 days.

(21) Appl. No.: 12/608,232

(22) Filed: Oct. 29, 2009

(65) Prior Publication Data

US 2010/0110576 A1    May 6, 2010

(30) Foreign Application Priority Data

Oct. 31, 2008   (JP) .................. 2008-281576

(51) Int. Cl.
*G11B 11/00* (2006.01)
(52) U.S. Cl. .................................. 369/13.01
(58) Field of Classification Search .............. None
See application file for complete search history.

(56) References Cited

U.S. PATENT DOCUMENTS

| | | | |
|---|---|---|---|
| 6,754,020 B1 | 6/2004 | Hikosaka et al. | |
| 7,446,969 B2 | 11/2008 | Akagi et al. | |
| 7,582,193 B2* | 9/2009 | Kawada | 204/192.12 |
| 2001/0051287 A1 | 12/2001 | Kikitsu et al. | |
| 2002/0015864 A1 | 2/2002 | Maesaka et al. | |
| 2002/0098390 A1* | 7/2002 | Do et al. | 428/694 TS |
| 2002/0192506 A1 | 12/2002 | Coffey et al. | |
| 2003/0079984 A1 | 5/2003 | Okatani et al. | |
| 2004/0071923 A1* | 4/2004 | Fullerton et al. | 428/65.3 |
| 2005/0084715 A1* | 4/2005 | Hee et al. | 428/694 TM |
| 2005/0142378 A1 | 6/2005 | Nemoto et al. | |
| 2007/0096854 A1 | 5/2007 | Matsumoto et al. | |
| 2007/0212574 A1 | 9/2007 | Berger et al. | |
| 2008/0049357 A1 | 2/2008 | Akagi et al. | |
| 2008/0074776 A1* | 3/2008 | Soeya | 360/59 |

(Continued)

FOREIGN PATENT DOCUMENTS

EP  0 502 699 A1  9/1992

(Continued)

OTHER PUBLICATIONS

S. H. Kiou et al.; Granular metal films as recording media; Appl. Phys. Lett.; Feb. 8, 1988; pp. 512-514.

(Continued)

*Primary Examiner* — Joseph Haley
*Assistant Examiner* — Henok Heyi
(74) *Attorney, Agent, or Firm* — Antonelli, Terry, Stout & Kraus, LLP.

(57) ABSTRACT

A thermally assisted magnetic recording medium includes a substrate and at least two, i.e., first and second magnetic recording layers. These layers are hard magnetic layers and contain magnetic grains and a non-magnetic substance magnetically segregating the magnetic grains at grain boundaries. The first magnetic recording layer has a magnetic anisotropy energy $K_{u1}$, a grain volume $v_1$, and energy for maintaining its recording magnetization $K_{u1}v_1$; the second magnetic recording layer has a magnetic anisotropy energy $K_{u2}$, a grain volume $v_2$, and energy for maintaining its recording magnetization $K_{u2}v_2$; and the ratio $K_{u1}v_1/k_BT$ of $K_{u1}v_1$ to a thermal fluctuation energy $k_BT$, where $k_B$ represents a Boltzmann constant and T represents an absolute temperature, and the ratio $K_{u2}v_2/k_BT$ of $K_{u2}v_2$ to $k_BT$ satisfy the following conditions: $K_{u1}v_1/k_BT$ is larger than $K_{u2}v_2/k_BT$ at room temperature, but is smaller than $K_{u2}v_2/k_BT$ at temperatures around the Curie temperature of the first magnetic recording layer.

20 Claims, 14 Drawing Sheets

U.S. PATENT DOCUMENTS

| | | |
|---|---|---|
| 2008/0075979 A1 | 3/2008 | Inamura et al. |
| 2008/0204917 A1 | 8/2008 | Nakamura et al. |
| 2009/0011281 A1* | 1/2009 | Oikawa et al. ............... 428/812 |

FOREIGN PATENT DOCUMENTS

| | | |
|---|---|---|
| JP | 05-067322 | 3/1993 |
| JP | 06-111403 | 4/1994 |
| JP | 2000-067425 | 3/2000 |
| JP | 2000-293802 | 10/2000 |
| JP | 2001-076331 | 3/2001 |
| JP | 2002-025032 | 1/2002 |
| JP | 2002-358616 | 12/2002 |
| JP | 2003-045004 | 2/2003 |
| JP | 2003-141719 | 5/2003 |
| JP | 2005-190538 | 7/2005 |
| JP | 2006-012249 | 1/2006 |
| JP | 2008-052869 | 3/2008 |
| JP | 2008-084413 | 4/2008 |

OTHER PUBLICATIONS

Hideki Saga et al.; New recording Method Combining Thermo-Magnetic Writing and Flux Detection; Japanese Journal of Applied Physics; Mar. 1999; pp. 1839-1840; vol. 38, Part 1, No. 3B.

Junichi Fujikata et al., Near field optical head with a surface Plasmon resonance structure; Optics Japan; 3pA6, 2002, pp. 174-175; j-fujikata@cj.jp.nec.com.

Hikari To Jiki et al. (in Japanese; Light and Magnetism), Katsuaki Sato, Asakura Publishing Co., Ltd. Tokyo Japan, 2001; pp. 156-159.

J.-U. Thiele et al.; Temperature dependent magnetic properties of highly chemically ordered $Fe_{55-x}Ni_xPt_{45}L1$ films; Journal of Applied Physics; May 15, 2002; pp. 6595-6600; vol. 91 No. 10.

N. Iwata et al.; Magnetic properties of amorphous magnetic film on self-assembled convex pattern; Advanced Technology Research Laboratories, Sharp Corporation, Tenri, Nara, Japan; Intermag 2008; Digest AE-05.

R. F. Evans et al.; Investigation of magnetic reversal modes for Heat Assisted Magnetic Recording; Intermag 2008, Digest AE-07.

* cited by examiner (T= 300K)

|  | $M_s$ (film) (emu/cm³) | $\langle H_k \rangle$ (kOe) | INTERGRANULAR EXCHANGE ENERGY (erg/cm²) | INTERLAYER EXCHANGE ENERGY (erg/cm²) | $T_c$ (K) |
|---|---|---|---|---|---|
| THE FIRST MAGNETIC RECORDING LAYER | 250 | 30 | 0.11 | 1.0 | 600 |
| THE SECOND MAGNETIC RECORDING LAYER | 400 | 18 | 0.12 | | 1000 |

(T= 300K)

| | $M_s$ (film) (emu/cm³) | $\langle H_k \rangle$ (kOe) | INTERGRANULAR EXCHANGE ENERGY (erg/cm²) | INTERLAYER EXCHANGE ENERGY (erg/cm²) | $T_c$ (K) |
|---|---|---|---|---|---|
| THE FIRST MAGNETIC RECORDING LAYER | 250 | 30 | 0.11 | 3.0 | 600 |
| THE SECOND MAGNETIC RECORDING LAYER | 400 | 40 | 0.12 | | 800 |

MAGNETIZATION PATTERN
IN THE SECOND EMBODIMENT

THE SECOND MAGNETIC LAYER

THE FIRST MAGNETIC LAYER

MAGNETIZATION PATTERN
OF COMPARATIVE MEDIUM

THE SECOND MAGNETIC LAYER

THE FIRST MAGNETIC LAYER

THERMALLY ASSISTED RECORDING MEDIA AND SYSTEM

CLAIM OF PRIORITY

The present application claims priority from Japanese patent application JP 2008-281576 filed on Oct. 31, 2008, the content of which is hereby incorporated by reference into this application.

BACKGROUND OF THE INVENTION

1. Field of the Invention

The present invention relates to thermally assisted magnetic recording media having a high recording density. It also relates to thermally assisted magnetic recording systems including the thermally assisted magnetic recording medium, a probe of near-field light that irradiates the thermally assisted magnetic recording medium with light, and a magnetic read-write head.

2. Description of the Related Art

A magnetic disc system mounted typically on a computer is one of information storage systems that support present-day information society and is rapidly becoming higher in recording density, higher in speed, and smaller in size. In order for the magnetic disc system to achieve a high recording density, it is necessary, for example, to reduce the distance between a magnetic disc (magnetic recording medium) and a magnetic head, to reduce the size of crystal grains that form a magnetic recording layer of the magnetic recording medium, to increase the coercivity (or magnetic anisotropy field) of the magnetic recording medium, and to speed up signal processing.

In magnetic recording media, the diameter of magnetic grains existing in the magnetic recording layer is reduced as much as possible and crystal grain boundaries are provided between those magnetic grains to weaken the magnetic coupling between those magnetic grains, thereby reducing the noise of the recorded magnetization information. However, the resistance to the thermal energy goes lower if the volume of the magnetic grains is reduced, because the thermal energy required for maintaining the recording magnetization is in proportion to the volume of the respective magnetic grains.

One of possible solutions to the above problem is to increase the magnetic anisotropy energy $K_u$ of the subject magnetic recording layer. The magnetic anisotropy energy $K_u$ is a physical property value for representing the stability of magnetizing direction, that is, the difficulty of reversing the magnetizing direction. The magnetic anisotropy energy $K_u$ is determined by the crystal structure and/or the material of magnetic grains. If the ambient temperature is defined as T, the volume of respective isolated magnetic grains is defined as V, and the Boltzmann constant is defined as $k_B$, respectively, the magnetization reversal comes to occur more often under the influence of thermal fluctuation in reverse proportion to the value of $K_u V/k_B T$. Such frequency occurrence of thermal decay of magnetization can therefore be suppressed if the magnetic anisotropy energy $K_u$ is increased to compensate for the reduction of the V value. A wide variety of materials having a high magnetic anisotropy energy $K_u$ has been examined. Typically, a superlattice multilayer is now focused. The superlattice multilayer is a thin film formed by laminating two types of thin films alternately and artificially, each of the thin films having an atomic scale thickness and containing an element different from that of the other. The superlattice multilayer can thus have physical properties that do not exist naturally. As such superlattice multilayers, there are some well-known ones, each of which is obtained by laminating a ferromagnetic metal (Co, Fe) and a noble metal (Pd, Pt) alternately. Typically, Japanese Patent Application Laid-Open Publication No. H05(1993)-67322 discloses a perpendicularly magnetized layer that uses a Co/Pt superlattice multilayer. Japanese Patent Application Laid-Open Publication No. 2003-141719 and Japanese Patent Application Laid-Open Publication No. H06(1994)-111403 respectively disclose perpendicularly magnetized layers using a superlattice multilayer. All those media are so-called "continuous layers" having no grain boundary between grains. Media using an alloy of a ferromagnetic metal (Co, Fe) and a noble metal (Pd, Pt) as a magnetic recording layer, such as media disclosed in Japanese Patent Application Laid-Open Publication No. 2000-67425 and Japanese Patent Application Laid-Open Publication No. 2008-84413, also have a high magnetic anisotropy energy $K_u$. These media, however, are also continuous layers.

A technique for promoting segregation of magnetic grains from one another has been employed in known media for use in hard disc drives (HDDs). The technique forms grain boundaries by adding oxide to the subject magnetic metal layer. Typically, if a magnetic metal alloy such as CoCrPt (cobalt-chromium-platinum alloy) and a non-metal material such as $SiO_2$ are vacuum-deposited at the same time under predetermined conditions, mesh-like oxide grain boundaries are formed so as to surround the magnetic metal alloy grains, respectively. Media manufactured by this technique are generally referred to as granular media (Appl. Phys. Lett. 52(1988) p. 512). The noise of the granular media is extremely reduced, because the magnetic grains are segregated from one another by a non-magnetic oxide layer, the magnetic exchange-coupling therebetween is thereby weak and the magnetic crystal grains are formed finely.

Under these circumstances, Japanese Patent Application Laid-Open Publication No. 2002-25032 and Japanese Patent Application Laid-Open Publication No. 2005-190538 each disclose a technique for converting a superlattice multilayer having a high magnetic anisotropy energy $K_u$ into a granular medium. The resulting granulated superlattice multilayer is supposed to achieve a high recording density.

Increase in anisotropy energy, namely, increase in magnetic anisotropy field (or coercivity) also means increase in head-field intensity required for recording. According to current techniques, however, the head-field intensities are hitting a ceiling. The ceiling is made typically by the material of magnetic pole used in write head, and the distance between a magnetic disc and a magnetic head. In other words, it becomes difficult to further reduce the distance between the magnetic disc and the magnetic head. Under these conditions, it becomes difficult to carry out recording even on media using CoCr alloys, and it is more difficult to carry out recording on superlattice multilayers and on alloy layers made of anisotropic materials. As a possible solution to this problem, a variety of media using CoCr alloys and having two or more magnetic layers has been proposed. As exemplary media having two magnetic layers, exchange coupling media (ECC media) have been proposed typically in US Patent Application Publication No. 2007/0212574. In the exchange coupling media, one of the two magnetic layers is a soft-magnetic layer that is susceptible to magnetization reversal (magnetization rotation) or a continuous layer analogous thereto, and the other magnetic layer is a granular layer made from a hard magnetic material. The soft-magnetic layer or continuous layer undergoes magnetization reversal at a bottom magnetic field and thereby undergoes switching prior to the hard-magnetic layer (hereinafter the former is referred to as a "switching layer"). The switching layer, once undergoing magnetization reversal, accelerates the magnetization reversal of the magnetic recording layer (hard-magnetic layer) to carry out recording, because the upper and lower magnetic layers magnetically interact with each other.

Hybrid recording techniques using both an optical recording technique and a magnetic recoding technique are supposed to be effective for solving the ceiling problem in head-field intensity. The techniques are effective typically when a higher magnetic anisotropy energy $K_u$ is required for proving a higher recoding density, as in superlattice multilayers and highly anisotropic alloy layers. Typically, Jpn. J. Appl. Phys. 38(1999), p. 1839 discloses a technique using a specific read-write head. In the read-write head, a mechanism for light generation is added to a portion where a recording magnetic field is generated. According to this technique, light is generated in addition to an applied magnetic field upon recording, and the recording is performed on a medium while heating the medium to reduce the anisotropy energy (magnetic anisotropy field or coercivity). This technique enables easy recording even on media having a high coercivity for use in recording at ultra-high density. In contrast, recording on such media having a high coercivity is difficult by using common magnetic heads because of insufficient recording magnetic field. However, a heat generating device has to rapidly heat and cool a tiny heating region to achieve a high recording density for such magnetic disc system. Accordingly, there is a limit to the approach of focusing laser light through a lens generally used for optical recording. The approach of generating near-field light by a metallic surface plasmon is proposed as a possible solution for solving this, and studies are carried out (Optics Japan 2002 Extended Abstracts, 3pA6 (2002); and Japanese Patent Application Laid-Open Publication No. 2003-45004). The reading herein uses a giant magnetic resistance (GMR) head or tunneling magnetoresistive (TMR) head as in common magnetic recording. This recording technique is referred to as thermally assisted magnetic recording.

Recording techniques close to the thermally assisted magnetic recording technique include an optical magnetic recording technique ("Hikari To Jiki (in Japanese; Light and Magnetism)", Katsuaki SATO, Asakura Publishing Co., Ltd., Tokyo Japan, (2001), p. 156). The optical magnetic recording technique utilizes, for magnetic recording, a change in magnetic properties based on a temperature increase in the medium by laser light irradiation. Such optical magnetic recording techniques are classified as several types by the recording procedure. One of them is a recording technique that involves heating, to Curie temperature, a medium typically using TbFe (terbium-iron alloy) or GdTbFe (gadolinium-terbium-iron alloy). Specifically, spontaneous magnetization decreases sharply in the vicinity of the Curie temperature, and paramagnetism develops at or above the Curie temperature. At this time, a magnetic field is applied in an opposite direction. In a cooling process, magnetization reversal occurs, so that a mark is recorded. Another type is a recording technique that involves heating a medium made of GdFeO (gadolinium-iron-oxygen alloy) or GdCo (gadolinium-cobalt alloy) at or above a compensation temperature. This technique utilizes a phenomenon given below. When two sublattice magnetizations of ferrimagnetism compensate each other at a temperature on which these magnetizations are dependent, macroscopic magnetization becomes zero (which is called a "compensation temperature"), so that coercivity is maximized. When such a material as has a compensation temperature at room temperature is heated at or above the compensation temperature, therefore, the coercivity is reduced, so that magnetization is oriented in the direction of an external magnetic field. According to current techniques, however, the recording technique relating to the Curie temperature and the recoding technique relating to the compensation temperature are used in combination. In any case, the medium is made of an amorphous alloy film of rare earth and transition metal. A record mark is determined by forming a cylindrical magnetic domain. Formation of the magnetic domain is determined by a balance between some forms of magnetic energy (such as external magnetization energy and magnetic domain wall energy) acting on the medium. Because of having no grain boundary, the amorphous alloy film has the merit of achieving a low noise level as compared to a CoCr-based granular medium that has been used for magnetic discs. However, as the spot size of light becomes smaller, the record mark may possibly become larger than the spot size of light or become rather smaller and disappear. Consequently, the amorphous alloy film is considered to be unsuitable for high recording densities.

The thermally assisted magnetic recording is characterized by facilitating recording by heating the medium to reduce the magnetic anisotropy field intensity (or the coercivity) of the medium, as mentioned above. In other words, the magnetic anisotropy field intensity of the medium has dependence on temperature, and therefore the magnetic anisotropy field intensity becomes lower as the temperature of the medium becomes higher (J. Appl. Phys. 91, 10(2002) p. 6595). In the thermally assisted magnetic recording, the medium should be heated to its Curie temperature or higher (see The 2008 IEEE International Magnetics Conference (Intermag 2008) Digest AE-05 and Intermag 2008 Digest AE-07). Typically, by taking a medium made of a FeNiPt alloy as an example, its Curie temperature elevates with an increasing magnetic anisotropy field $H_k$ and is about 750 K at a magnetic anisotropy field $H_k$ of 80 kOe (J. Appl. Phys. 91, 10(2002) p. 6595). However, it is desired to carry out heating at a temperature as low as possible, because the medium, if heated to such a high temperature, can plastically deform and thereby have deteriorated magnetic properties.

Accordingly, it is important to examine materials and structures of media for carrying out thermally assisted magnetic recording at a temperature as low as possible. Typically, Japanese Patent Application Laid-Open Publication No. 2000-293802, Japanese Patent Application Laid-Open Publication No. 2001-76331, Japanese Patent Application Laid-Open Publication No. 2002-358616, Japanese Patent Application Laid-Open Publication No. 2008-52869, and US Patent Application Publication No. 2002/0192506 disclose techniques in which a medium including two or more magnetic recording layers is used and recording thereon is performed at a temperature that is higher than the Curie temperature of one of the two layers (assuming for example a lower layer) but is equal to or lower than the Curie temperature of the other layer (assuming for example an upper layer). These techniques perform recoding according to a mechanism as follows. Specifically, the magnetization of the lower layer whose Curie temperature is below the recording temperature is minimized or disappear to decouple the magnetic exchange coupling between the lower and upper layers. Then recording is performed on the upper layer whose Curie temperature is higher than the recording temperature (whose magnetization remains), and the magnetic exchange coupling again occurs during cooling process of the medium to thereby transfer the magnetization of the upper layer to the lower layer. Thus, recording is performed. The upper and lower layers refer to as a recording layer and a transfer layer, respectively.

SUMMARY OF THE INVENTION

According to the thermally assisted magnetic recording techniques disclosed in Japanese Patent Application Laid-Open Publication No. 2000-293802, Japanese Patent Application Laid-Open Publication No. 2001-76331, Japanese Patent Application Laid-Open Publication No. 2002-358616, Japanese Patent Application Laid-Open Publication No. 2008-52869, and US Patent Application Publication No. 2002/0192506, the magnetic anisotropy energy $K_u$ (magnetic anisotropy field $H_k$ or coercivity $H_c$) of the magnetic layer having a Curie temperature higher than the recording temperature must be sufficiently minimized to perform recording by the action of a head magnetic field. Specifically, these techniques suffer from limitations typically in materials, because the head magnetic field limits the recording even though they employ thermally assisted magnetic recording mechanism. In addition, the medium is rapidly cooled during transferring process of the magnetization pattern, the magnetic anisotropy energy $K_u$ of the transfer layer may sharply increase so that the temperature of the medium can reach room temperature before the magnetization of the recording layer is transferred to the transfer layer. Simultaneously, the erased magnetization information of the transfer layer may be reversely transferred to the recording layer. These phenomena are actually experimentally verified by the present inventors.

In consideration of such circumstances, the thermally assisted magnetic recording should satisfy the following conditions: (1) the medium is a granular layer which includes magnetic grains segregated from one another by a non-magnetic oxide layer; (2) recording can be performed at low temperatures; (3) the magnetic anisotropy energy $K_u$ (magnetic anisotropy field $H_k$ or coercivity $H_c$) of the magnetic layer of the medium is not restricted by the head magnetic field; and (4) once recording is performed on one magnetic recording layer, the recorded information is transferred to the other magnetic recording layer without failure.

Accordingly, an object of the present invention is to provide a thermally assisted magnetic recording medium that enables recording at low temperatures in which the magnetic anisotropy field intensity of its magnetic recording layers is not restricted by the head magnetic field.

Another object of the present invention is to provide a thermally assisted magnetic recording system that enables thermally assisted magnetic recording at ultrahigh densities.

Specifically, according to a representative embodiment of the present invention, there is provided a thermally assisted magnetic recording medium which includes a substrate; and at least two magnetic recording layers arranged on or above the substrate, in which the magnetic recording layers include a first magnetic recording layer and a second magnetic recording layer, are hard magnetic layers, and each contain magnetic grains and a non-magnetic substance magnetically segregating the magnetic grains from one another at grain boundaries. The first magnetic recording layer has a magnetic anisotropy energy $K_{u1}$, a volume of grains $v_1$, and an energy $K_{u1}v_1$ for maintaining its recording magnetization; the second magnetic recording layer has a magnetic anisotropy energy $K_{u2}$, a volume of grains $v_2$, and energy for maintaining its recording magnetization of $K_{u2}v_2$; and the ratio $K_{u1}v_1/k_BT$ of the energy $K_{u1}v_1$ to a thermal fluctuation energy $k_BT$, wherein 4 represents a Boltzmann constant and T represents an absolute temperature, and the ratio $K_{u2}v_2/k_BT$ of the energy $K_{u2}v_2$ to the thermal fluctuation energy $k_BT$ satisfy the following conditions:

the ratio $K_{u1}v_1/k_BT$ is larger than the ratio $K_{u2}v_2/k_BT$ at room temperature but is smaller than the ratio $K_{u2}v_2/k_BT$ at temperatures around the Curie temperature of the first magnetic recording layer.

According to another representative embodiment of the present invention, there is provided a thermally assisted magnetic recording system which includes an information recording medium; a magnetic pole for applying a magnetic field to the information recording medium; and a device for heating a predetermined region of the information recording medium, in which the information recording medium includes a substrate and at least two magnetic recording layers arranged on or above the substrate, the magnetic recording layers includes a first magnetic recording layer and a second magnetic recording layer, are hard magnetic layers, and each contain magnetic grains and a non-magnetic substance magnetically segregating the magnetic grains from one another at grain boundaries. In this system, the first magnetic recording layer has a magnetic anisotropy energy $K_{u1}$, a volume of grains $v_1$, and an energy $K_{u1}v_1$ for maintaining its recording magnetization; the second magnetic recording layer has a magnetic anisotropy energy $K_{u2}$, a volume of grains $v_2$, and energy for maintaining its recording magnetization of $K_{u2}v_2$; the ratio $K_{u1}v_1/k_BT$ of the energy $K_{u1}v_1$ to a thermal fluctuation energy $k_BT$, wherein $k_B$ represents a Boltzmann constant and T represents an absolute temperature, and the ratio $K_{u2}v_2/k_BT$ of the energy $K_{u2}v_2$ to the thermal fluctuation energy $k_BT$ satisfy the following conditions: the ratio $K_{u1}v_1/k_BT$ is larger than the ratio $K_{u2}v_2/k_BT$ at room temperature but the ratio $K_{u1}v_1/k_BT$ is smaller than the ratio $K_{u2}v_2/k_BT$ at temperatures around the Curie temperature of the first magnetic recording layer; and the first magnetic recording layer undergoes magnetization reversal prior to the second magnetic recording layer to thereby perform recording to form a magnetization reversal pattern, and the magnetization reversal pattern of the first magnetic recording layer is transferred to the second magnetic recording layer.

The magnetic anisotropy field intensity of the second magnetic recording layer is preferably larger than the intensity of a magnetic field applied by the magnetic pole at temperatures around the Curie temperature of the first magnetic recording layer. The Curie temperature of the first magnetic recording layer is preferably lower than the Curie temperature of the second magnetic recording layer. The system preferably performs recording at a temperature lower than the Curie temperature of the first magnetic recording layer.

According to an embodiment of the present invention, there can be provided a thermally assisted magnetic recording medium that enables recording at low temperatures in which the magnetic anisotropy energy $K_u$ (magnetic anisotropy field $H_k$ or coercivity $H_c$) of its magnetic recording layer(s) is not restricted by the head magnetic field. The medium performs recording according to the following mechanism. Specifically, the medium has at least two granular magnetic recording layers, in which the order of the ratio $K_uv/k_BT$ of one layer with respect to the ratio $K_uv/k_BT$ of the other layer is reversed between room temperature and a temperature around the Curie temperature, whereby recording is performed preferentially on a magnetic recording layer having a lower ratio $K_uv/k_BT$ at a recording temperature that is equal to or lower than the Curie temperature, and the recorded magnetization information is transferred to the other magnetic recording layer. The medium therefore enables recording at low temperatures in which the magnetic anisotropy energy $K_u$ (magnetic anisotropy field $H_k$ or coercivity $H_c$) of the magnetic recording layer is not restricted by the head magnetic field. This enables thermally assisted magnetic recording at ultra-high densities.

Further objects, features and advantages of the present invention will become apparent from the following description of the preferred embodiments with reference to the attached drawings.

BRIEF DESCRIPTION OF THE DRAWINGS

FIGS. 2, 2A, and 2B are schematic drawings illustrating a structure of a magnetic disc system according to an embodiment of the present invention, in which FIG. 2A is an enlarged view of a magnetic head slider, and FIG. 2B is an enlarged view of a magnetic head;

DESCRIPTION OF THE PREFERRED EMBODIMENTS

The present invention will be illustrated in detail with reference to several embodiments below and the attached drawings.

First Embodiment

Figure 2:
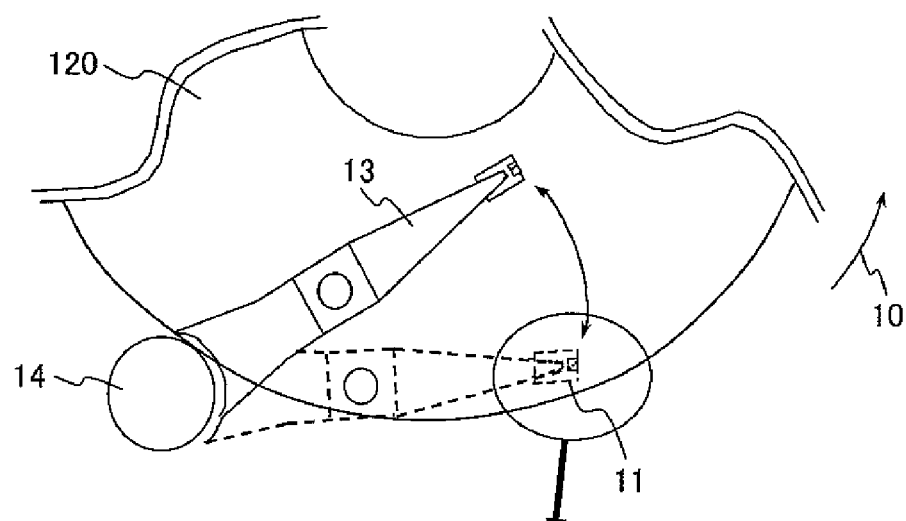
Figure 2A:
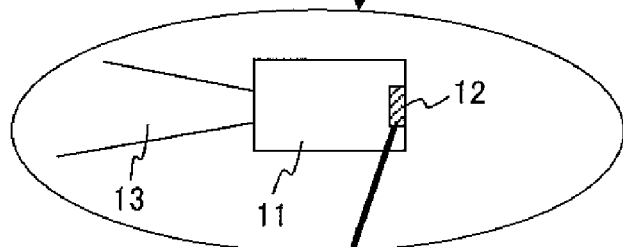
Figure 2B:
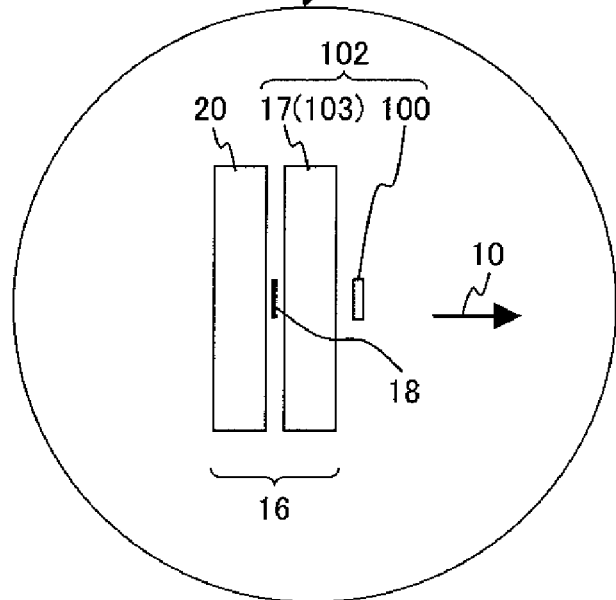

FIGS. 2, 2A, and 2B are schematic drawings illustrating a structure of a magnetic disc system (magnetic recording system) according to an embodiment of the present invention. One or more magnetic discs 120 are generally loaded in a drive unit of the magnetic recording system. The magnetic recording medium (magnetic disc) 120 is rotatively driven in the direction of an arrow 10 in FIG. 2. With reference to the enlarged view FIG. 2A, a magnetic head 12 is arranged at the rear end of a magnetic head slider 11 which is fixed at the distal end of a carriage 13. The magnetic head 12, when driven by the action of a voice coil motor 14, accesses a desired track and performs either the writing or reading of information to and from the magnetic recording medium. FIG. 2B is a schematic enlarged view of the magnetic head 12, illustrating the configuration of a write head 102 for writing and a read head 16 for reading, when viewed from an opposite side to the magnetic recording medium. The write head 102 is a single pole type write head for perpendicular magnetic recording and includes a main pole 100 and an auxiliary pole 103. The auxiliary pole 103 functions also as a magnetic shield (bottom magnetic shield) 17. Magnetic recording is performed on the magnetic recording medium 120 by the action of a magnetic field leaked out from the main pole 100. The read head 16 includes the magnetic shield (bottom magnetic shield) 17, a magnetic shield (upper magnetic shield) 20, and a read sensor 18. The read sensor 18 is arranged between the magnetic shields 17 and 20 and includes a magnetoresistive element. A magnetic flux leaked out from the magnetic recording medium 120 flows into the read sensor 18 to give an output signal.

Figure 3:
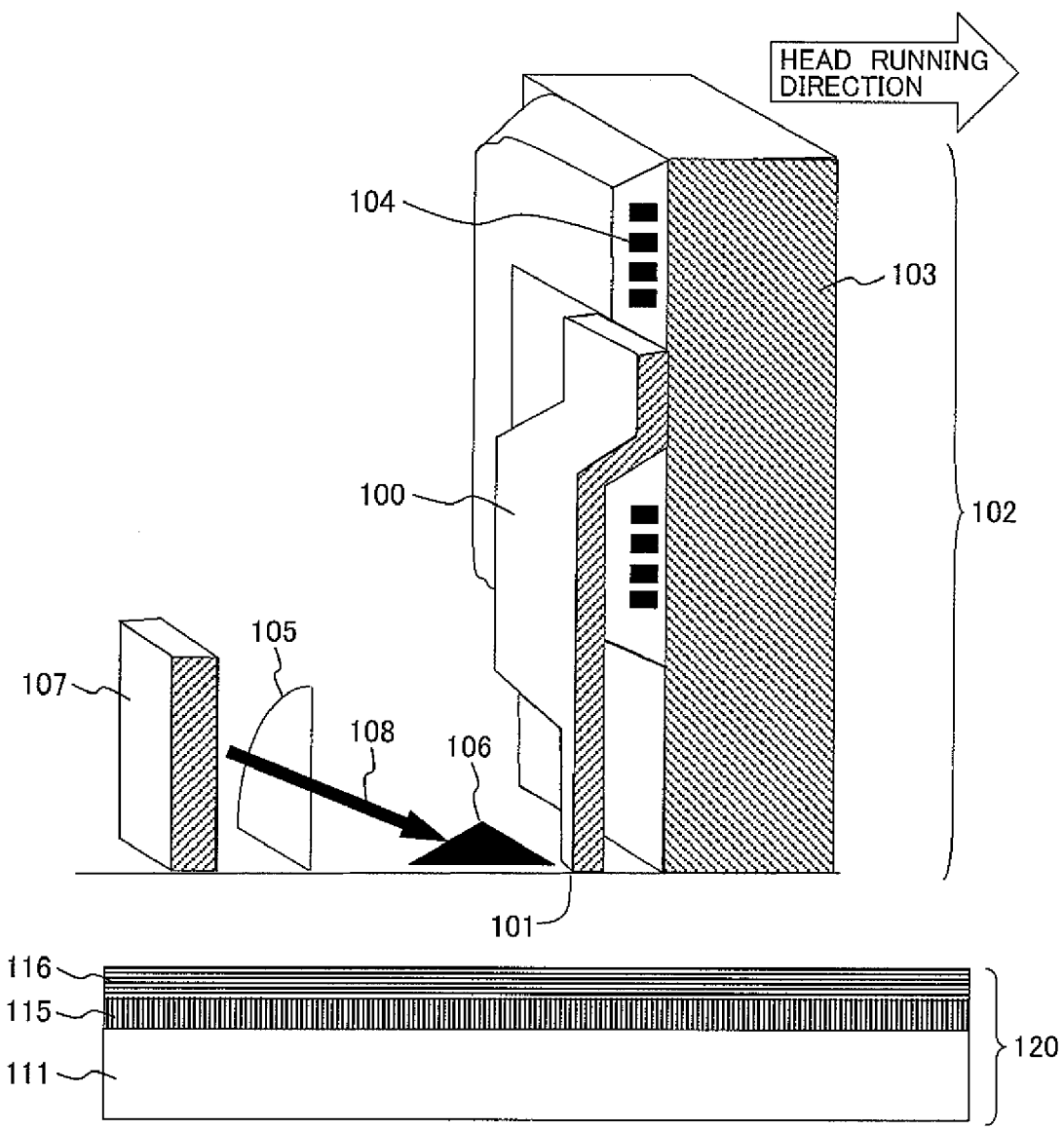
FIG. 3 depicts a configuration example illustrating a write head of a magnetic disc system according to an embodiment of the present invention.

FIG. 3 depicts a configuration example of a write head for use herein and illustrates a cross-sectional structure of the vicinity of the write head. The cross section of the read head is perpendicular to the magnetic recording medium (vertical direction in FIG. 3) and in parallel with the head-running direction.

The write head 102 includes a main pole 100 and an auxiliary pole 103. The auxiliary pole 103 is in the form of a flat plate and arranged substantially perpendicular to the magnetic recording medium 120. A conductive pattern (coil) 104 is helically arranged on the auxiliary pole 103. Both terminal ends of the coil 104 are lead out to a magnetic head drive circuit. One end of the main pole 100 is connected to the auxiliary pole 103, and the other end extends to reach the bottom of the write head 102 and faces the magnetic recording medium 120. The auxiliary pole 103, main pole 100, and conductive pattern 104 as a whole constitute an electromagnet. The supply of a drive current leads to the application of a recording magnetic field to first and second magnetic recording layers 115 and 116 in the vicinity of the distal end of the main pole 100. The write head 102 further includes an optical dispersion (scatterer) 106, a plane laser 107, and a hologram lens 105. The optical dispersion 106 is arranged at an end 101 of trailing edge of the main pole 100 and faces the magnetic recording medium 120. The plane laser 107 and hologram lens 105 serve to irradiate the optical dispersion 106 with laser light 108. Thin film deposition process and lithography process can be used to fabricate a read-write head of the above-described configuration.

To record information on the magnetic recording medium 120, the laser light 108 is emitted from the plane laser 107 as a light source, simultaneously with the generation of the recording magnetic field. The laser light is focused through the hologram lens 105 onto the metallic optical dispersion 106. Irradiation of the metallic optical dispersion 106 with the coherent laser light 108 leads to the uniform oscillation of free electrons within the optical dispersion 106 by the action of an electric field of the laser light 108, resulting in the excitation of plasmon and thereby in the generation of strong near-field light at the distal end of the metallic optical dispersion 106. The metallic optical dispersion 106 illustrated in FIG. 3 is triangular, but it may have another structure such as an aperture structure. In the above manner, the first magnetic recording layer 115 and second magnetic recording layer 116, during recording, are simultaneously heated by the near-field light to have decreased magnetic anisotropy energy $K_u$ (magnetic anisotropy field $H_k$ or coercivity $H_c$). Thereby, a desired recording magnetization transition according to information to be recorded develops in the first and second magnetic recording layers 115 and 116, even when the magnetic field applied from the main pole 100 is weak.

To reproduce information recorded on the magnetic recording medium 120, the read head equipped with a magnetic flux sensing device such as a GMR (giant magnetoresistive effect) element or TMR (tunneling magnetoresistive effect) element is used to detect a leakage flux from the magnetic recording layers, and thereby magnetically reproduce the information.

Figure 4:
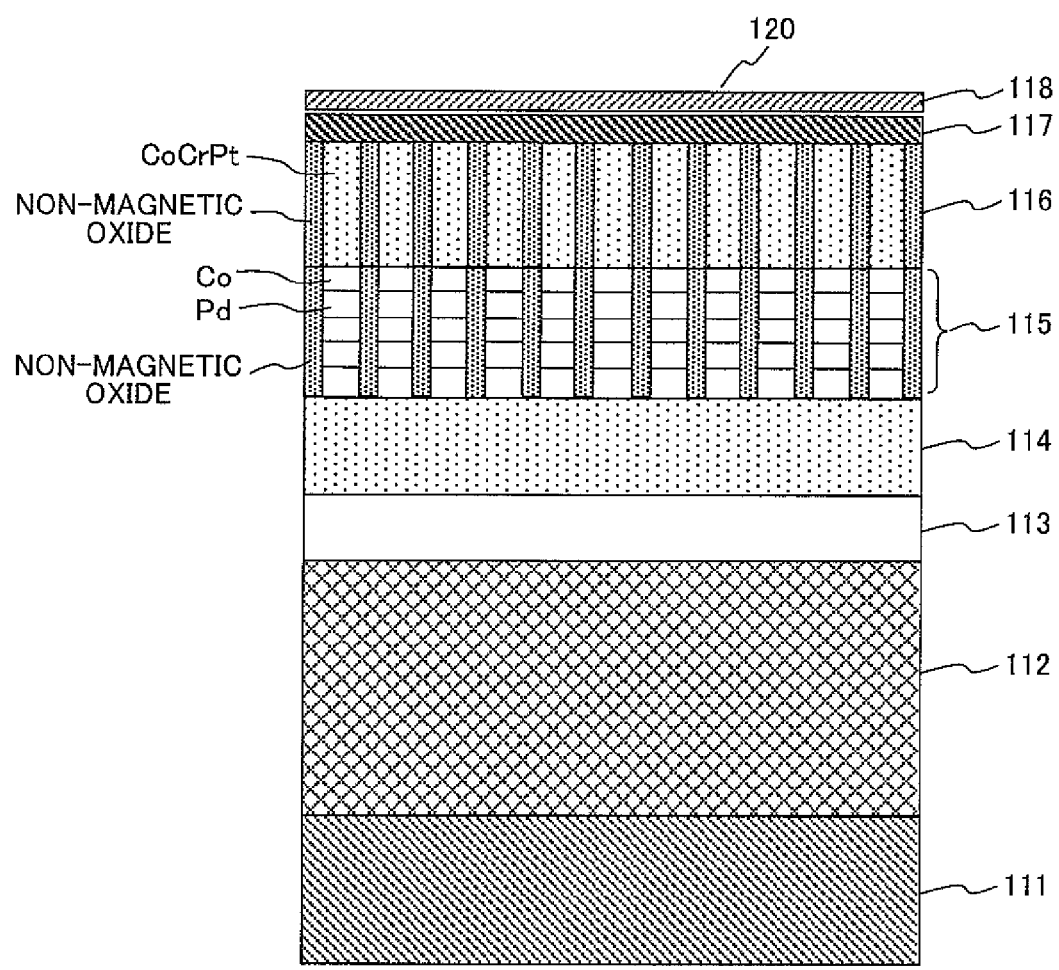
FIG. 4 depicts a configuration example of a medium according to the first embodiment of the present invention.

FIG. 4 depicts a basic layer configuration of a thermally assisted magnetic recording medium according to the first embodiment of the present invention. The magnetic recording medium structurally includes a non-magnetic substrate 111, a soft-magnetic underlayer 112, a seed layer 113, an intermediate layer 114, a first magnetic recording layer 115, a second magnetic recording layer 116, an overcoat 117, and a liquid lubricant film 118 in this order.

The non-magnetic substrate 111 can be chosen from among a variety of substrates, as long as having a flat or smooth surface. Exemplary substrates include aluminum alloy substrates bearing a NiP (nickel-phosphorus) plating; and reinforced glass substrates.

Exemplary materials for the soft-magnetic underlayer 112 include iron alloys having a microcrystalline structure, such as FeTaC (iron-tantalum-carbon) alloys and FeSiAl (iron-silicon-aluminum) alloys; and cobalt alloys having an amorphous structure, such as CoNbZr (cobalt-niobium-zirconium) alloys, CoTaZr (cobalt-tantalum-zirconium) alloys, and CoFeTaZr (cobalt-iron-tantalum-zirconium) alloys. The soft-magnetic underlayer is unnecessary when a sufficient head-field intensity required for recording can be obtained without use thereof.

The seed layer 113 is arranged, according to necessity, between the soft-magnetic underlayer 112 and intermediate layer 114. Materials for the seed layer 113 are selected from among polycrystalline materials having a face centered cubic (fcc) structure or hexagonal close packed (hcp) structure; and amorphous materials. The seed layer 113 contains, for example, at least one element selected from the group consisting of Ta, Ni, Cr, Cu, Ti, Fe, W, Co, Ru, Pt, Pd, and C. The seed layer 113 effectively helps the intermediate layer 114 to have a higher crystal orientation and helps the soft-magnetic underlayer 112 and the intermediate layer 114 to isolate from each other.

An exemplary material for the intermediate layer 114 is a mixture of a metal oxide and a non-magnetic alloy mainly containing cobalt and chromium (CoCr-base alloy). The intermediate layer, if composed of this material, has a granular structure including microcrystalline grains of the CoCr-based alloy surrounded by grain boundaries of the metal oxide. The intermediate layer 114 having this structure helps to accelerate the formation of a microstructure in an initial grown layer of the magnetic recording layer 115, because the structure is similar to the structure of the first magnetic recording layer 115 to be formed on the intermediate layer 114.

The first magnetic recording layer 115 is formed from a mixture of a ferromagnetic alloy material and a non-magnetic material such as oxide. The ferromagnetic alloy material has a large perpendicular magnetic anisotropy at room temperature. Possible exemplary ferromagnetic alloy materials include CoPt (cobalt-platinum) alloys, FePt (iron-platinum) alloys, and SmCo (samarium-cobalt) alloys; as well as [Co/Pt]n multilayer films and [Co/Pd]n multilayer films (superlattice multilayers). A first magnetic recording layer composed of a multilayer film is illustrated by way of example in this embodiment. The first magnetic recording layer 115 is formed typically by alternately depositing layers of cobalt each 0.1 nm to 1 nm thick and layers of platinum or palladium each 0.1 nm to 2 nm thick to give a multilayer film having a total thickness of 20 nm or less. The first magnetic recording layer 115 contains oxygen as in the intermediate layer 114. Most of oxygen in the first magnetic recording layer 115 is present as one or more metal oxides. The metal oxides are segregated from magnetic crystal grains to form grain boundaries to thereby divide magnetic crystal grains into a large number of fine magnetic crystal grains. Thus, a granular structure is formed. Exemplary materials for constituting oxides in the first magnetic recording layer 115 include B, Al, Cr, Hf, Mg, Si, Ta, Ti, and Zr. These oxides preferably have an oxygen content of 6 atomic percent or more and 20 atomic percent or less. The first magnetic recording layer 115 may contain $SiO_2$ as the non-magnetic material.

The second magnetic recording layer 116 is formed from a mixture of a ferromagnetic cobalt alloy material with a non-magnetic material such as oxide, as in the first magnetic recording layer. The materials to constitute the second magnetic recording layer, however, should have a magnetic anisotropy energy $K_u$ at room temperature lower than that of the first magnetic recording layer. The second magnetic recording layer 116 and the first magnetic recording layer 115 should be magnetically coupled.

The total thickness of the first magnetic recording layer 115 and second magnetic recording layer 116 is preferably 5 nm or more and 20 nm or less. If the total thickness is less than 5 nm, the resulting medium may show poor thermal stability, and if it exceeds 20 nm, the grain size may become excessively large, resulting in higher noise level.

The intermediate layer 114, first magnetic recording layer 115, and second magnetic recording layer 116 each have a granular structure and contain a large number of crystal grains. The grain size (average grain diameter) of the crystal grains is preferably controlled to be 4 nm or more and 10 nm or less. If the grain size is less than 4 nm, the medium may show poor thermal stability, and if it exceeds 10 nm, the medium may suffer from a high noise level. The crystal grain sizes of the first magnetic recording layer 115 and second magnetic recording layer 116 can be measured typically with a transmission electron microscope.

Figure 5:
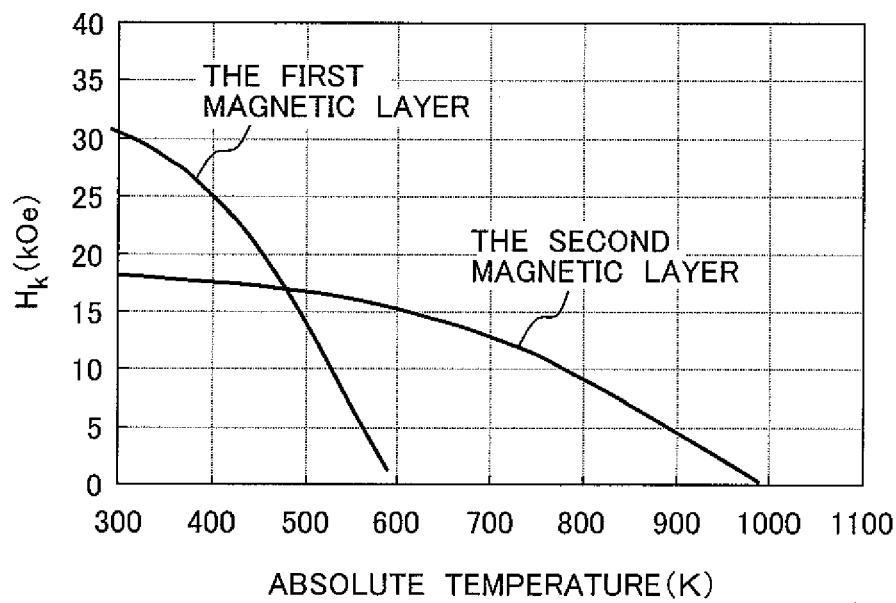
FIG. 5 is a graph illustrating the dependence of anisotropy field on temperature in the first embodiment of the present invention.

FIG. 5 is a graph illustrating, by way of example, how the magnetic anisotropy fields $H_k$ of a first magnetic recording layer and a second magnetic recording layer vary depending on temperature. The first magnetic recording layer herein is a cobalt/palladium (Co/Pd) multilayer granular layer including a total of fifteen layers including cobalt layers each 0.2 nm thick and palladium layers each 0.6 nm thick stacked alternately. This first magnetic recording layer has a high magnetic anisotropy field $H_k$ at room temperature of 30 kOe and a low Curie temperature of 600 K. The second magnetic recording layer is a CoCrPt (cobalt-chromium-platinum) granular layer and has a magnetic anisotropy field $H_k$ at room temperature of 18 kOe lower than that of the first magnetic recording layer and a Curie temperature of 1000 K higher than that of the first magnetic recording layer.

The magnetic anisotropy field $H_k$ may be determined typically in the following manner. Initially, the magnetization versus applied magnetic field (MH loop or hysteresis loop) is plotted typically using a vibrating sample magnetometer (VSM), and the thermal behaviour of saturation magnetization $M_s$ is determined. Next, the thermal behaviour of magnetic anisotropy energy $K_u$ is determined by measuring torques acting on respective directions of the medium typically with a magnetic anisotropy torque meter, while varying the direction of magnetic field through rotation of the electromagnet. The thermal behaviour of magnetic anisotropy field $H_k$ is determined according to the equation: $H_k(T)=2\times K_u(T)/M_s(T)$.

Figure 1:
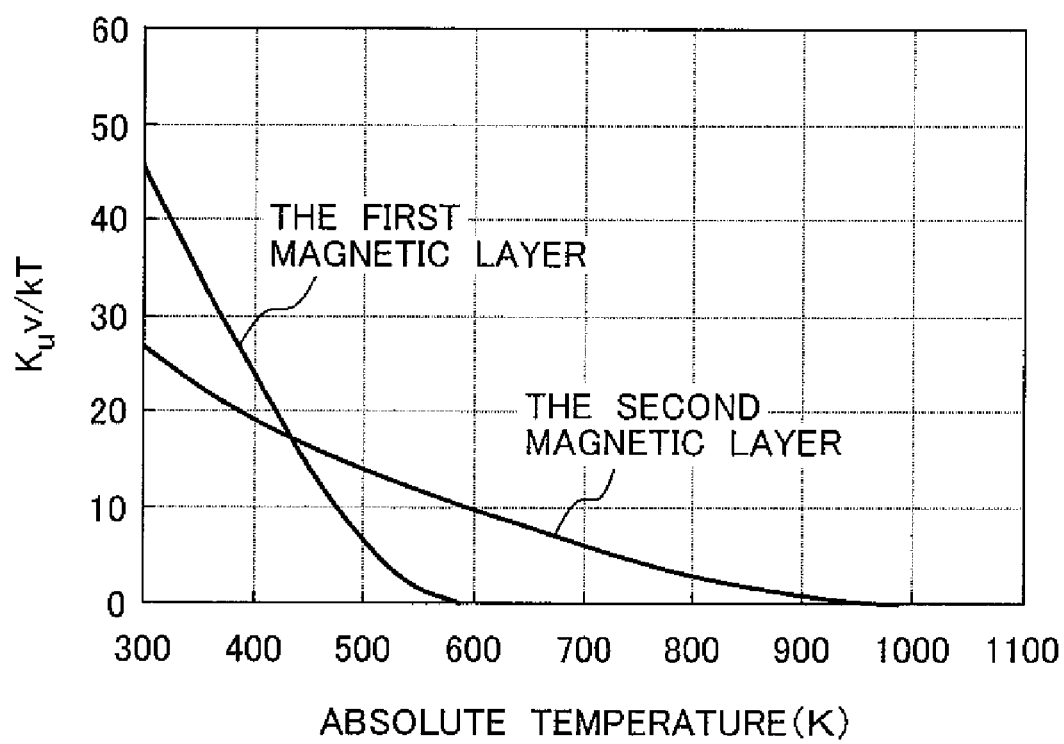
FIG. 1 is a graph illustrating the dependence of the ratio $K_u v/k_B T$ on temperature in a first embodiment of the present invention.

FIG. 1 illustrates, by way of example, how the ratios $K_u v/k_B T$ of the first magnetic recording layer and second magnetic recording layer vary depending on temperature. The data demonstrate that, at room temperature, the first magnetic recording layer has a ratio $K_u v/k_B T$ of 45 and the second magnetic recording layer has a ratio $K_u v/k_B T$ of 27 lower than that of the first magnetic recording layer; but that, at temperatures around the Curie temperature, the first magnetic recording layer has a ratio $K_u v/k_B T$ lower than that of the second magnetic recording layer. The ratio $K_u v/k_B T$ can be experimentally determined, for example, in the following manner. A remanent magnetization loop is plotted while varying the sweep rate at several levels, from which remanent coercivity $H_{cr}$ is determined, and the dependence of $H_{cr}$ on the time is fitted into the Sharrock equation (IEEE Trans. Mag. 30(6), 1994).

The advantages of the thermally assisted magnetic recording medium according to the first embodiment are verified through computer simulation using micromagnetics.

The computation is conducted using Langevin equation which is obtained by adding magnetic field H(t) caused by thermal energy to Landau-Lifshitz-Gilvert equation (J. Appl. Phys. 75(2), 15, January 1994).

The head field is analyzed by the commercial program JMAG for three-dimensional analysis of magnetic field. The effective head-field $(H_x^{2/3}+H_z^{2/3})^{3/2}$ (x: down-track direction, z: vertical direction) applied to the center of the medium is about 11 kOe at a light-irradiated position 20 nm away from the trailing edge. The space between the head and medium is 9 nm. The influence of the soft-magnetic layer is calculated using an image effect. The thermal profile is assumed to be a Gaussian distribution with a half value width of 50 nm.

The output signal is obtained by substituting the sensitivity function of the MR head for the reciprocity theorem expression (Mitsunori Matsumoto: Jiki Kiroku (in Japanese; Magnetic Recording) (Kyoritsu Shuppan Co., Ltd., Tokyo, 1977)). The output conditions are such that the distance between the shields Gs is 30 nm and the write track pitch $T_{WT}$ is 33 nm.

Figure 6:
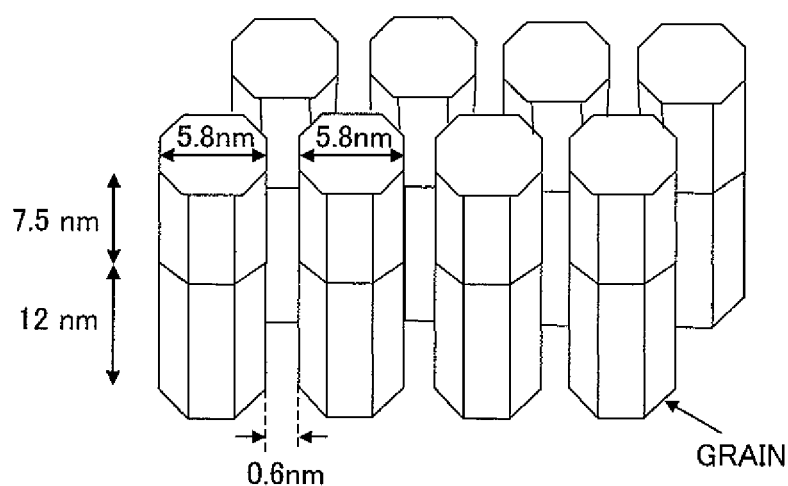
FIG. 6 depicts a configuration example of a medium model for computer simulation.
Figures 7, 8:
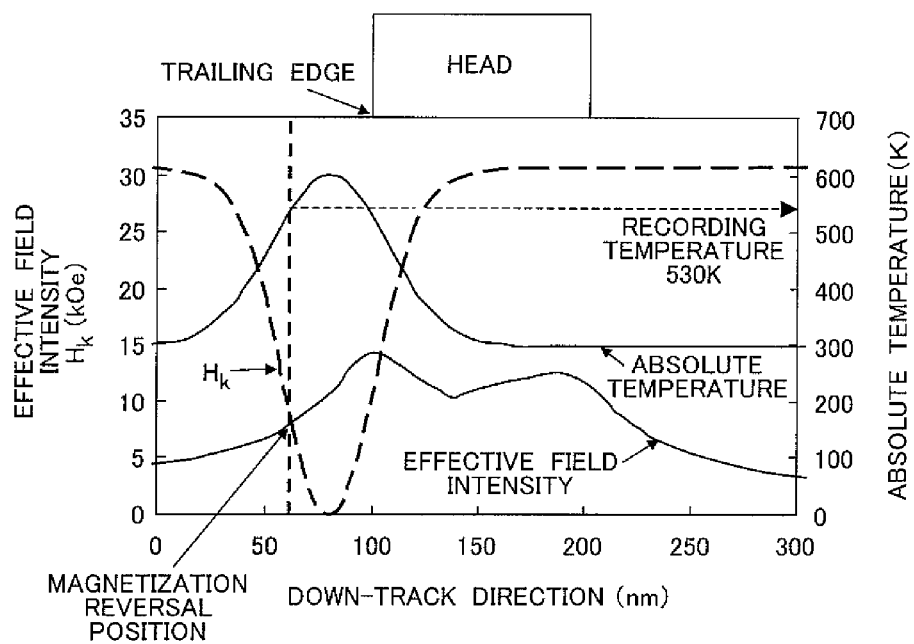
FIG. 7 is a table showing the dependence of magnetic characteristics of the medium in the first embodiment of the present invention.
FIG. 8 is a diagram illustrating effective head-field intensity, temperature, and anisotropy field distribution.
Figure 9A:
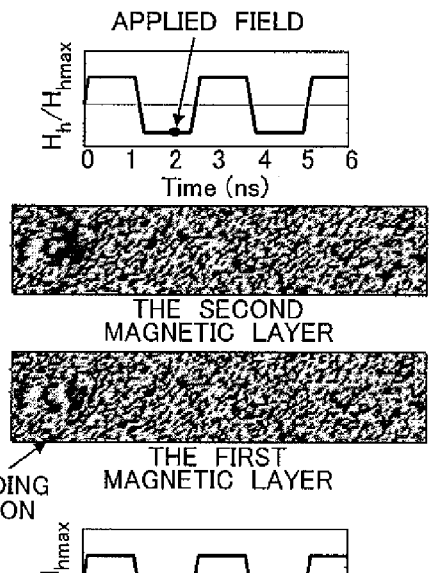
FIGS. 9A, 9B, 9C, 9D, 9E, 9F, 9G, and 9H depict recording magnetization patterns in recording process in the first embodiment of the present invention.
Figure 9B:
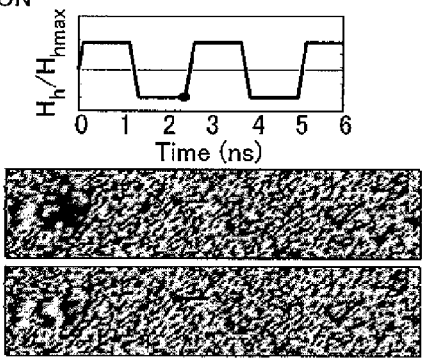
Figure 9C:
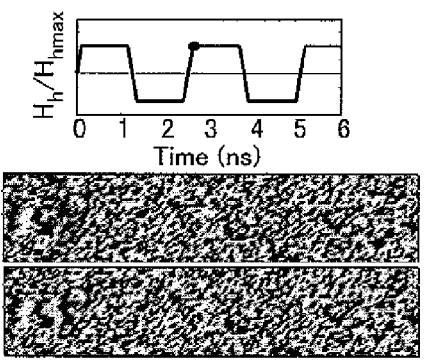
Figure 9D:
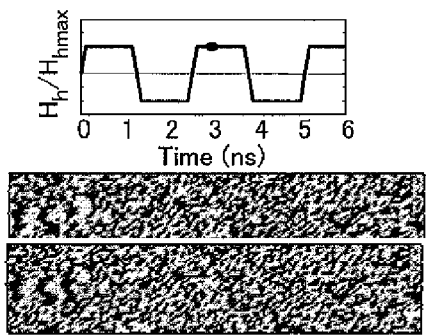
Figure 9E:
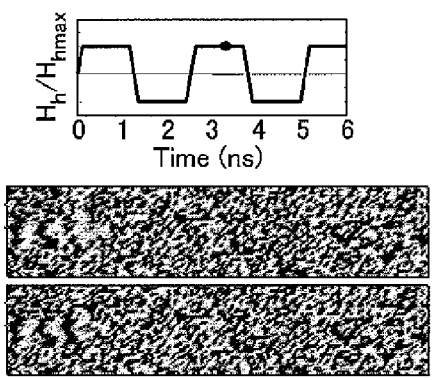
Figure 9F:
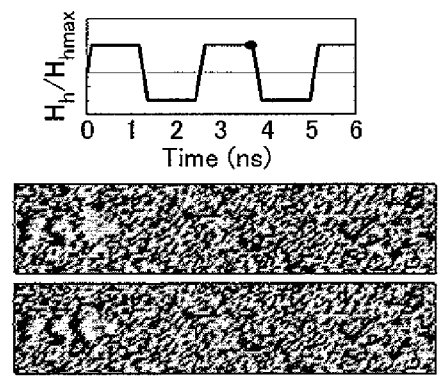
Figure 9G:
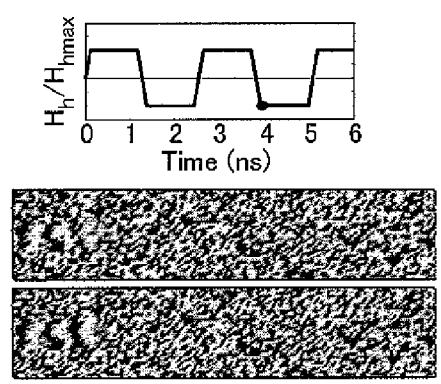
Figure 9H:
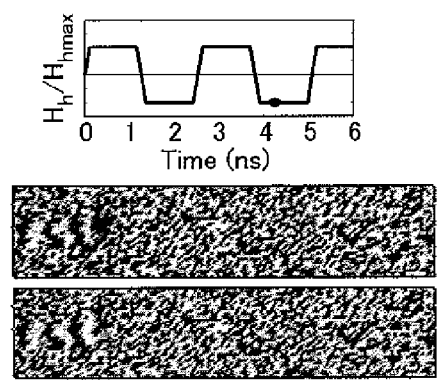

The medium is assumed to be a granular medium in which grains having a grain size of 5.8 nm are distributed at intervals (space) between them of 0.6 nm, and the grains each include an upper layer 7.5 nm thick and a lower layer 12 nm thick, as illustrated in FIG. 6. The magnetic characteristics of the medium are assumed as in the table in FIG. 7. The thermal behavior of the magnetic anisotropy field $H_k$ is as in FIG. 5. The maximum value of the light irradiation temperature is set to be 600 K, i.e., the Curie temperature of the first magnetic recording layer. The magnetic anisotropy field $H_k$ of the second magnetic recording layer at the Curie temperature of the first magnetic recording layer is 15 kOe (FIG. 5) and is larger than the maximum effective head-field intensity of 11 kOe (FIG. 8). FIG. 8 shows effective head-field intensity, temperature, and magnetic anisotropy field $H_k$ distributions. A magnetic field necessary for magnetization reversal is referred to as a "switching field", and the magnetic anisotropy field $H_k$ distribution is herein assumed to be equal to the switching field. The magnetic anisotropy field $H_k$ herein is that of the first magnetic recording layer. The position of magnetization transition, i.e., recording position is defined in the vicinity of an intersection between the effective head-field and the magnetic anisotropy field $H_k$, whereby the temperature at this position is to be the recording temperature. The recording temperature is 530 K as read out from FIG. 8. This recording temperature is lower than the Curie temperature of the first magnetic recording layer. This demonstrates that the second magnetic recording layer does not undergo magnetization reversal by the action of the head field, even when the maximum value of light irradiation temperature is set to be 600 K. FIGS. 9A, 9B, 9C, 9D, 9E, 9F, 9G, and 9H depict recording magnetization patterns measured at intervals of 0.3 nanosecond in recording process at a recording density of 1000 kilo flux changes per inch (kfci). The time goes from 9A through 9B, 9C, 9D, 9E, 9F, and 9G to 9H in this order. FIG. 9A depicts that the application of a magnetic field in the negative direction makes the magnetization reversed to the negative direction, in which a closed portion (filled portion) represents magnetization in the negative direction. FIG. 9C depicts that the applied magnetic field is reversed to the positive direction. The magnetic field reversal determines the magnetization transition of the negative-direction magnetization of the first magnetic recording layer, whereas the magnetization transition of the second magnetic recording layer is not clear. The magnetization is gradually transferred to the second magnetic recording layer as shown from FIG. 9E to FIG. 9G, and is completely transferred thereto as in FIG. 9H. These results demonstrate that information is initially recorded on the first magnetic recording layer, and thereafter the recorded information is transferred from the first magnetic recording layer to the second magnetic recording layer. The precedence of the first magnetic recording layer in recording is because the ratio $K_{u1}v_1/k_B T$ of the first magnetic recording layer is sufficiently lower than the ratio $K_{u2}v_2/k_B T$ of the second magnetic recording layer at the recording temperature, and thereby recording is more easily performed on the first magnetic recording layer than the second magnetic recording layer. In addition, the recording magnetization can be rapidly stabilized in cooling process, because the ratio $K_{u1}v_1/k_B T$ of the first magnetic recording layer rapidly increases in cooling process. Based on the above computing simulation, the SNR ratio of the signal S to the noise N ($=20\times\log(S/N)$) is found to be about 12 dB.

The signal-noise ratio SNR can be further increased by disposing a layer of Co (cobalt) or CoRu (cobalt-ruthenium) about 1 nm to 2 nm thick between the first magnetic recording layer and second magnetic recording layer so as to intensify the interlayer magnetic exchange coupling. Typically, when the interlayer exchange energy is simulated to be 3 erg/cm$^2$, the signal-noise ratio SNR is calculated to be 14 dB.

In the first embodiment as above, the second magnetic recording layer having a higher saturation magnetization Ms is arranged nearer to the head than the first magnetic recording layer is, so as to give a high output signal. The positional relation between the two layers, however, can be reversed. Typically, the first magnetic recording layer may be arranged nearer to the head than the second magnetic recording layer is. This enables the magnetization reversal of the first magnetic recording layer at a higher recording field because the recording is performed precedently on the first magnetic recording layer. This may enable further increase in the magnetic anisotropy energy $K_u$ (magnetic anisotropy field $H_k$ or coercivity $H_c$) of the first magnetic recording layer or may enable recording at a lower temperature.

Second Embodiment

Figure 10:
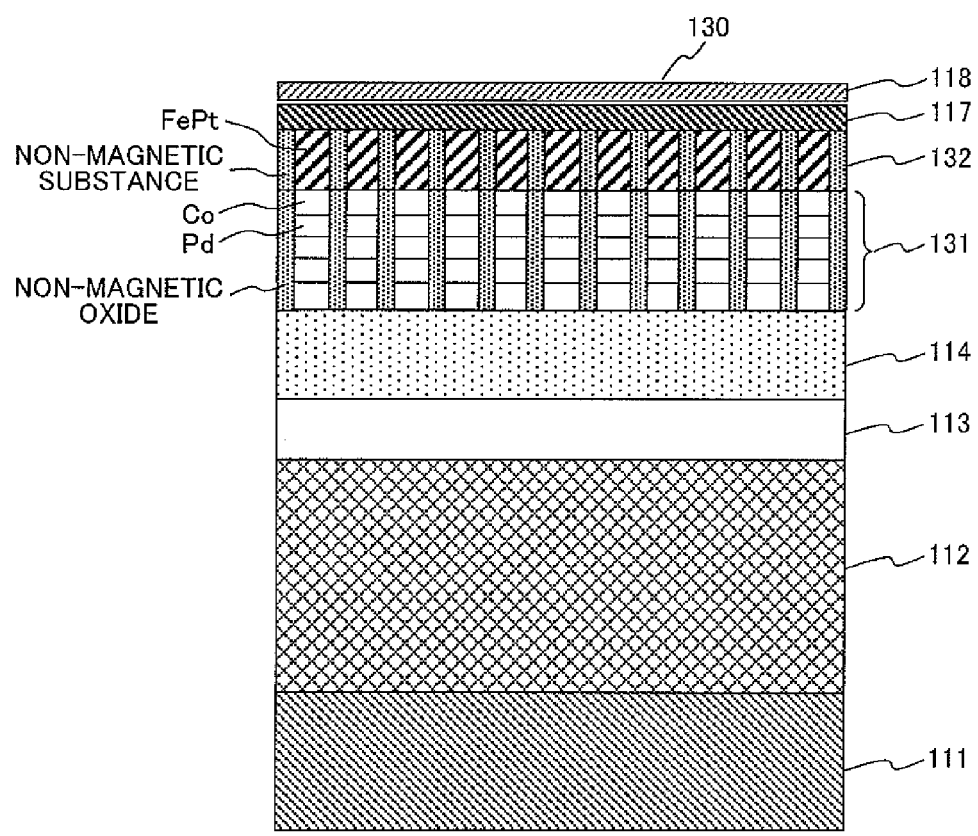
FIG. 10 depicts a configuration example of a medium model in a second embodiment of the present invention.

FIG. 10 is a cross-sectional view schematically illustrating the layer configuration of magnetic recording medium 130 in a second embodiment of the present invention.

A first magnetic recording layer 131 is formed from a mixture of a ferromagnetic alloy material with a non-magnetic material such as oxide. Possible exemplary ferromagnetic alloy materials include CoPt (cobalt-platinum) alloys, FePt (iron-platinum) alloys, and SmCo (samarium-cobalt) alloys; as well as [Co/Pt]n multilayer films and [Co/Pd]n multilayer films (superlattice layers). The first magnetic recording layer 131 is formed, for example, by alternately depositing layers of cobalt each 0.1 nm to 1 nm thick and layers of platinum or palladium each 1 nm to 2 nm thick to give a multilayer film having a total thickness of 20 nm or less. A second magnetic recording layer 132 is made from a ferromagnetic alloy material showing a large perpendicular magnetic anisotropy at room temperature as in the first embodiment. Examples thereof include an $L1_0$FePt film. To form a granular structure, an element that is dissolved in $L1_0$FePt and is non-magnetic, such as Ag, Sn, Pb, Sb, or Bi, is added as a third element, and a film is deposited through sputtering in a high-pressure argon atmosphere to cause self assembly. The thickness of the second magnetic recording layer is, for example, 2 nm or more and 10 nm or less. It should be noted, however, that the thickness of the second magnetic recording layer should always be smaller than that of the first magnetic recording layer. This is because the second magnetic recording layer should have a lower ratio $K_u v/k_B T$ at room temperature so as to use the second magnetic recording layer 132 as a transfer layer. In addition, a layer of FeMn (iron-manganese) or MnIr (manganese-iridium) is preferably arranged between the first magnetic recording layer and second magnetic recording layer. This suppresses the solid-solution of the non-magnetic oxide contained in the first magnetic recording layer into the second magnetic recording layer. The configuration other than the first magnetic recording layer and second magnetic recording layer is as in the first embodiment.

Figure 11:
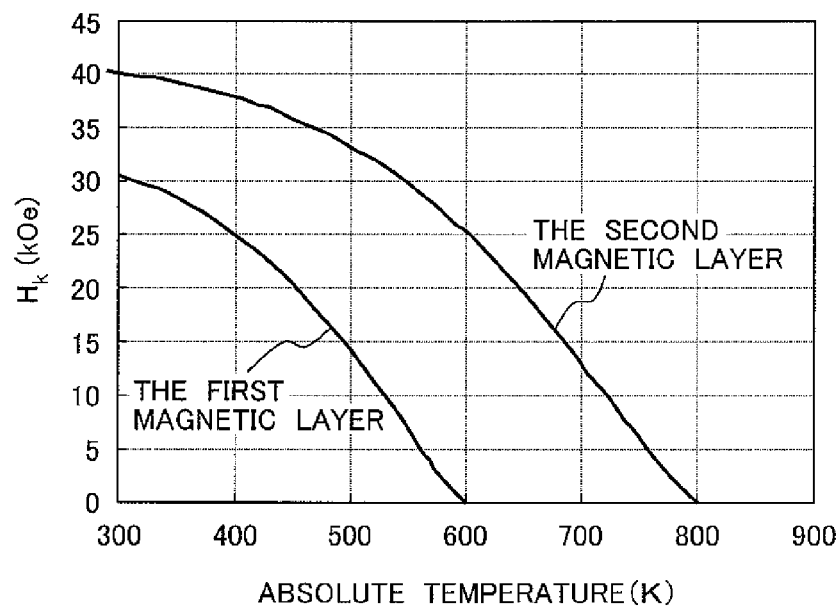
FIG. 11 is a graph illustrating the dependence of anisotropy field on temperature in the second embodiment of the present invention.
Figure 12:
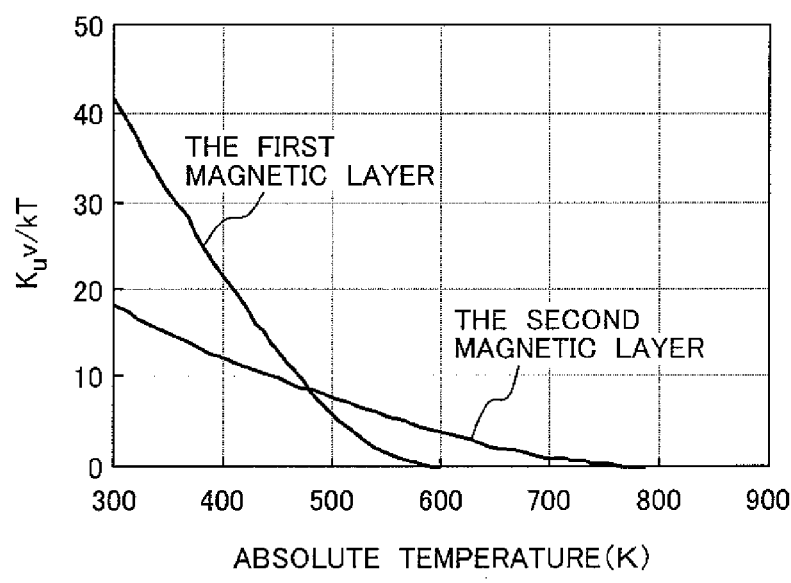
FIG. 12 is a graph illustrating the dependence of the ratio $K_u v/k_B T$ on temperature in the second embodiment of the present invention.

FIGS. 11 and 12 illustrate how the magnetic anisotropy field $H_k$ and the ratio $K_u v/k_B T$ vary on temperature, respectively. The first magnetic recording layer has a magnetic anisotropy field $H_k$ at room temperature of 30 kOe, a film thickness of 11 nm, and a Curie temperature of 600 K. The second magnetic recording layer has a magnetic anisotropy field $H_k$ at room temperature of 40 kOe, a film thickness of 2 nm, and a Curie temperature of 800 K. The maximum value of the light irradiation temperature is set to be 600 K (i.e., the Curie temperature of the first magnetic recording layer). The magnetic anisotropy field $H_k$ of the second magnetic recording layer at the Curie temperature of the first magnetic recording layer is 25 kOe (FIG. 11) and is larger than the maximum value of the effective head-field intensity of 11 kOe (FIG. 8). This demonstrates that the second magnetic recording layer does not undergo magnetization reversal by the action of the head field, even when the maximum value of light irradiation temperature is set to be 600 K, as in the first embodiment. The second magnetic recording layer has a magnetic anisotropy field $H_k$ at room temperature and a Curie temperature both higher than those of the first magnetic recording layer. However, regarding the dependence of the ratio $K_u v/k_B T$ on temperature, the ratio $K_u v/k_B T$ of the second magnetic recording layer is smaller than that of the first magnetic recording layer at room temperature, but it is larger than that of the first magnetic recording layer at temperatures around the Curie temperature. The first magnetic recording layer and second magnetic recording layer are magnetically coupled with each other.

Figures 13, 14:
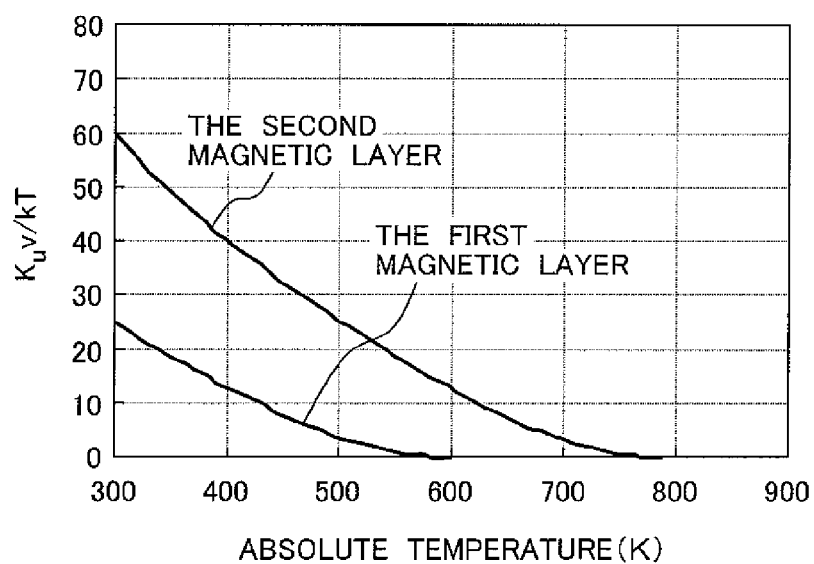
FIG. 13 is a table showing the dependence of magnetic characteristics of a medium in the second embodiment of the present invention.
FIG. 14 is a graph illustrating the dependence of the ratio $K_u v/k_B T$ on temperature of a comparative medium.
Figure 15A:
FIGS. 15A and 15B depict comparison of the recording magnetization patterns between the medium in the second embodiment of the present invention (FIG. 15A) and the comparative medium (FIG. 15B)
Figure 15A:
Figure 15B:
Figure 15B:
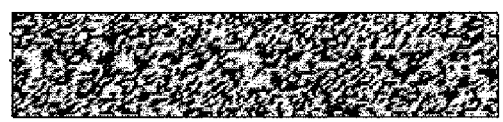
Figure 16A:
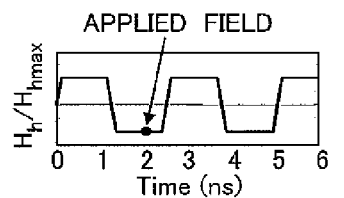
FIGS. 16A, 16B, 16C, and 16D depict recording magnetization patterns in recording process in the comparative medium.
Figure 16A:
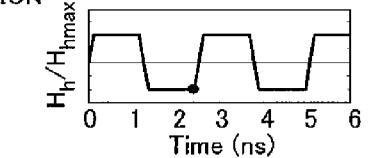
Figure 16B:
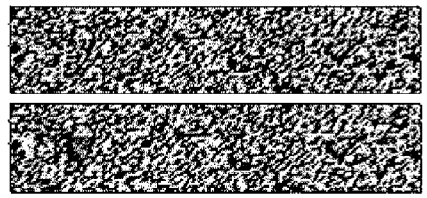
Figure 16C:
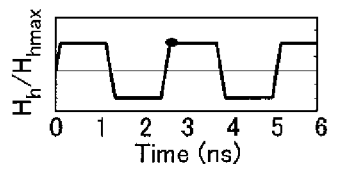
Figure 16C:
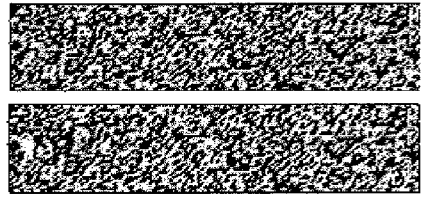
Figure 16D:
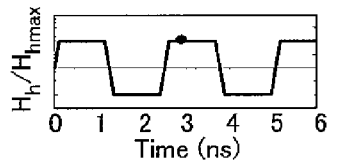
Figure 16D:
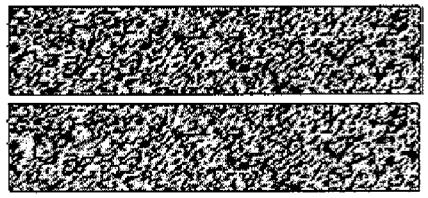

The advantages according to the second embodiment are verified through computer simulation. The medium herein is assumed to be a granular medium in which grains having a grain size of 5.8 nm are distributed at intervals (space) between them of 0.6 nm. The magnetic characteristics of the medium are assumed as in the table in FIG. 13. The thermal behavior of the magnetic anisotropy field $H_k$ is as in FIG. 11. The maximum value of the light irradiation temperature is set to be 600 K. The effective head-field intensity, temperature, and magnetic anisotropy field $H_k$ distribution are as in FIG. 8. Under these conditions, the recording temperature is 530 K, lower than the Curie temperature of the first magnetic recording layer. FIG. 14 depicts the thermal behavior of the ratio $K_u v/k_B T$ of a comparative medium. This comparative medium has the same structure as with one illustrated in FIG. 10, except that the first magnetic recording layer and second magnetic recording layer each have a thickness of 6.5 nm. In the comparative medium, the ratio $K_{u2} v_2/k_B T$ of the second magnetic recording layer is larger than the ratio $K_{u1} v_1/k_B T$ of the first magnetic recording layer at any temperature; and the Curie temperature of the second magnetic recording layer is higher than the Curie temperature of the first magnetic recording layer. FIGS. 15A and 15B depict a comparison in magnetization patterns between the medium according to the second embodiment and the comparative medium. The result demonstrates that the comparative medium shows no recording magnetization pattern, but the medium according to the second embodiment shows clear magnetization patterns. In the comparative medium, the ratio $K_{u1} v_1/k_B T$ of the first magnetic recording layer precedently decreases, whereby the magnetization thereof is once reversed. The recording magnetization, however, is not transferred to the second magnetic recording layer, because of its high ratio $K_{u2} v_2/k_B T$. In addition, the magnetic exchange interaction between the first magnetic recording layer and second magnetic recording layer increases during cooling process, and the recording pattern of the second magnetic recording layer is thereby reversely transferred to the magnetization pattern of the first magnetic recording layer, resulting in no recording on both magnetic recording layers. The magnetization patterns of the comparative medium during recording process are shown in FIGS. 16A, 16B, 16C, and 16D.

As a result of computer simulation as above, the signal-to-noise ratio (SNR) of the medium according to the second embodiment (=20×log(S/N)) is found to be about 13 dB.

In the second embodiment, the second magnetic recording layer having a higher saturation magnetization $M_s$ is arranged nearer to the head than the first magnetic recording layer is, so as to give a high output signal. The positional relation between the two layers, however, can be reversed. Typically, the first magnetic recording layer may be arranged nearer to the head than the second magnetic recording layer is. This enables the magnetization reversal of the first magnetic recording layer at a higher recording field, because the recording is performed precedently on the first magnetic recording layer. This may enable further increase in the magnetic anisotropy energy $K_u$ (magnetic anisotropy field $H_k$ or coercivity $H_c$ of the first magnetic recording layer or may enable recording at a lower temperature.

Figure 17:
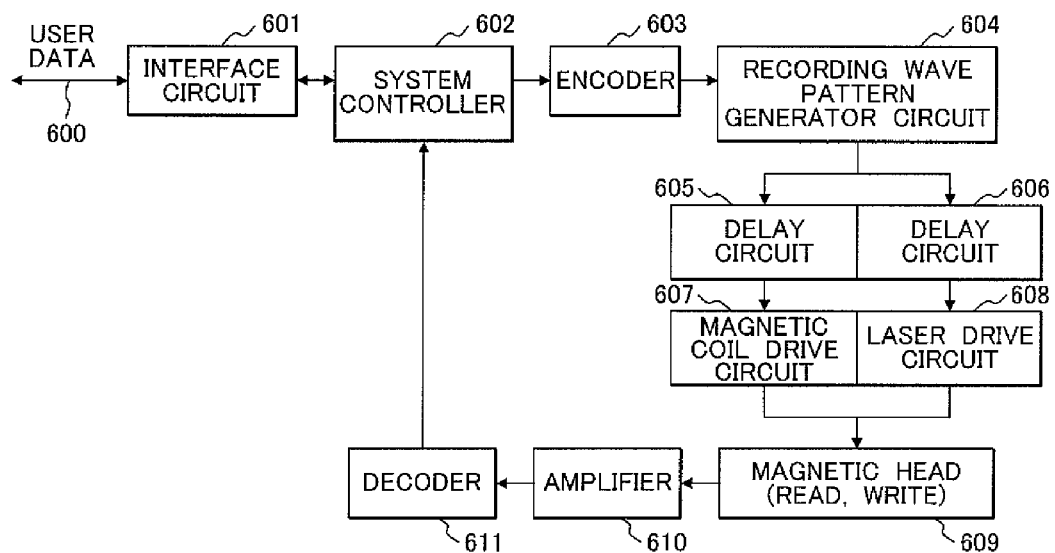
FIG. 17 is a block diagram illustrating a signal processing circuit for use in the present invention.

FIG. 17 is a schematic block diagram of a signal processing circuit. The recording of information is performed in the following manner. User data 600 to be recorded is fed to a system controller 602 through an interface circuit 601 to external equipment. The user data 600 is subjected typically to addition of error detection and error correction information, as needed. Then, the user data 600 is transmitted to an encoder 603. For example, the encoder 603 performs (1, 7) modulation on the user data 600 and then performs NRZI (non-return-to-zero-inverted) conversion on the user data 600 to thereby generate a signal that reflects the alignment of recording magnetization on a recording medium (not shown). By referring to the signal, a recording wave pattern generator circuit 604 generates a control signal for a recording bias magnetic field and a control signal for laser light intensity. Delay circuits 605 and 606 are further provided downstream from the recording wave pattern generator circuit 604, so as to correct a lag in drive timing between a magnetic coil drive circuit 607 and a laser drive circuit 608. This gives a control signal at a desired laser light intensity in accordance with the control signal for recording bias magnetic field. Upon receipt of a command from the system controller 602, the magnetic coil drive circuit 607 drives a recording coil (not shown) of a magnetic head 609 to thereby generate the recording bias magnetic field in an area where strong near-field light is generated by a metallic optical dispersion (not shown), in accordance with the control signal for the recording bias magnetic field. Upon receipt of a command from the system controller 602, the laser drive circuit 608 also drives a semiconductor laser (not shown) as a recording energy source, in accordance with the control signal for the laser light intensity. In this process, the laser drive circuit 608 drives semiconductor laser so that the interval of laser light irradiation agrees with the minimum magnetization reversal unit in the thermally assisted magnetic recording system.

The reproduction of information is performed in the following manner. A GMR element or TMR element scans the surface of a magnetic recording medium (not shown) to thereby detect a signal that reflects the alignment of recording magnetization. An output signal from the GMR element (or TMR element), which reflects the alignment of recording magnetization, is amplified to required level by an amplifier 610, and is then inputted to a decoder 611. The decoder 611 decodes recorded data by performing conversion inversely with the encoder 603, and then transmits the decoded data to the system controller 602. The system controller 602 subjects the data to processing such as error detection or error correction as needed, and then sends out the reproduced user data 600 to the external equipment via the interface circuit 601.

What is claimed is:

1. A thermally assisted magnetic recording medium comprising:
    a substrate; and
    at least two magnetic recording layers arranged on or above the substrate, the magnetic recording layers including a first magnetic recording layer and a second magnetic recording layer, the magnetic recording layers being hard magnetic layers, and the magnetic recording layers each containing magnetic grains and a non-magnetic substance magnetically segregating the magnetic grains from one another at grain boundaries,
    wherein the first magnetic recording layer has a magnetic anisotropy energy $K_{u1}$, a volume of grains $v_1$, and energy $K_{u1}v_1$ for maintaining its recording magnetization;
    wherein the second magnetic recording layer has a magnetic anisotropy energy $K_{u2}$, a volume of grains $v_2$, and energy for maintaining its recording magnetization of $K_{u2}v_2$; and
    wherein the ratio $K_{u1}v_1/k_BT$ of the energy $K_{u1}v_1$ to a thermal fluctuation energy $k_BT$, wherein $k_B$ represents a Boltzmann constant and T represents an absolute temperature, and the ratio $K_{u2}v_2/k_3T$ of the energy $K_{u2}v_2$ to the thermal fluctuation energy $k_BT$ satisfy the following conditions:
    the ratio $K_{u1}v_1/k_BT$ is larger than the ratio $K_{u2}v_2/k_BT$ at room temperature but the ratio $K_{u1}v_1/k_BT$ is smaller than the ratio $K_{u2}v_2/k_BT$ at temperatures around the Curie temperature of the first magnetic recording layer.

2. The thermally assisted magnetic recording medium according to claim 1, wherein the Curie temperature of the first magnetic recording layer is lower than the Curie temperature of the second magnetic recording layer.

3. The thermally assisted magnetic recording medium according to claim 1, wherein the first magnetic recording layer comprises at least one selected from the group consisting of a CoPt (cobalt-platinum) alloy layer, an FePt (iron-platinum) alloy layer, a SmCo (samarium-cobalt) alloy layer, a multi-layer including Co layers and Pt layers, and a multi-layer including Co layers and Pd layers; and wherein the second magnetic recording layer includes an alloy layer mainly containing cobalt (Co).

4. The thermally assisted magnetic recording medium according to claim 3, wherein the non-magnetic substance magnetically segregating the magnetic grains from one another comprises $SiO_2$ or an oxide of at least one element selected from the group consisting of B, Al, Cr, Hf, Mg, Si, Ta, Ti, and Zr.

5. The thermally assisted magnetic recording medium according to claim 4, wherein the oxide has an oxygen content of from 6 atomic percent to 20 atomic percent.

6. The thermally assisted magnetic recording medium according to claim 1, further comprising a Co (cobalt) layer or CoRu (cobalt-ruthenium alloy) layer between the first magnetic recording layer and the second magnetic recording layer.

7. The thermally assisted magnetic recording medium according to claim 1, wherein the first magnetic recording layer comprises at least one selected from the group consisting of a CoPt alloy layer, a FePt alloy layer, a SmCo alloy layer, a multi-layer including Co layers and Pt layers, and a multi-layer including Co layers and Pd layers; and wherein the second magnetic recording layer includes an $L1_0$FePt layer.

8. The thermally assisted magnetic recording medium according to claim 7, wherein the non-magnetic substance magnetically segregating the magnetic grains from one another comprises at least one element selected from the group consisting of Ag, Sn, Pb, Sb, and Bi.

9. The thermally assisted magnetic recording medium according to claim 7, further comprising a FeMn (iron-manganese alloy) layer or MnIr (manganese-iridium alloy) layer between the first magnetic recording layer and the second magnetic recording layer.

10. A thermally assisted magnetic recording system comprising:
    an information recording medium including:
        a substrate; and
        at least two magnetic recording layers arranged on or above the substrate, the magnetic recording layers including a first magnetic recording layer and a second magnetic recording layer, the magnetic recording layers being hard magnetic layers, and the magnetic recording layers each containing magnetic grains and a non-magnetic substance magnetically segregating the magnetic grains from one another at grain boundaries;

a magnetic pole for applying a magnetic field to the information recording medium; and a device for heating a predetermined region of the information recording medium, wherein the first magnetic recording layer has a magnetic anisotropy energy $K_{u1}$, a volume of grains $v_1$, and an energy $K_{u1}v_1$ for maintaining its recording magnetization;

wherein the second magnetic recording layer has a magnetic anisotropy energy $K_{u2}$, a volume of grains $v_2$, and energy for maintaining its recording magnetization of $K_{u2}v_2$;

wherein the ratio $K_{u1}v_1/k_BT$ of the energy $K_{u1}v_1$ to a thermal fluctuation energy $k_BT$, wherein $k_B$ represents a Boltzmann constant and T represents an absolute temperature, and the ratio $K_{u2}v_2/k_BT$ of the energy $K_{u2}v_2$ to the thermal fluctuation energy $k_BT$ satisfy the following conditions:

the ratio $K_{u1}v_1/k_BT$ is larger than the ratio $K_{u2}v_2/k_BT$ at room temperature but the ratio $K_{u1}v_1/k_BT$ is smaller than the ratio $K_{u2}v_2/k_BT$ at temperatures around the Curie temperature of the first magnetic recording layer; and wherein the first magnetic recording layer undergoes magnetization reversal prior to the second magnetic recording layer to thereby perform recording to form a magnetization reversal pattern, and the magnetization reversal pattern of the first magnetic recording layer is transferred to the second magnetic recording layer.

11. The thermally assisted magnetic recording system according to claim 10, wherein the magnetic anisotropy field intensity of the second magnetic recording layer is larger than the intensity of a magnetic field applied by the magnetic pole at temperatures around the Curie temperature of the first magnetic recording layer.

12. The thermally assisted magnetic recording system according to claim 10, wherein the Curie temperature of the first magnetic recording layer is lower than the Curie temperature of the second magnetic recording layer.

13. The thermally assisted magnetic recording system according to claim 10, wherein the system employs a recording temperature lower than the Curie temperature of the first magnetic recording layer.

14. The thermally assisted magnetic recording system according to claim 10, wherein the first magnetic recording layer includes one selected from the group consisting of a CoPt alloy layer, a FePt alloy layer, a SmCo alloy layer, a multi-layer including Co layers and Pt layers, and a multi-layer including Co layers and Pd layers; and wherein the second magnetic recording layer includes an alloy layer mainly containing cobalt (Co).

15. The thermally assisted magnetic recording system according to claim 14, wherein the non-magnetic substance magnetically segregating the magnetic grains from one another comprises $SiO_2$ or an oxide of at least one element selected from the group consisting of B, Al, Cr, Hf, Mg, Si, Ta, Ti, and Zr.

16. The thermally assisted magnetic recording system according to claim 15, wherein the oxide has an oxygen content of from 6 atomic percent to 20 atomic percent.

17. The thermally assisted magnetic recording system according to claim 10, wherein the information recording medium further includes a Co (cobalt) layer or CoRu (cobalt-ruthenium alloy) layer between the first magnetic recording layer and the second magnetic recording layer.

18. The thermally assisted magnetic recording system according to claim 10, wherein the first magnetic recording layer includes at least one selected from the group consisting of a CoPt alloy layer, a FePt alloy layer, a SmCo alloy layer, a multi-layer including Co layers and Pt layers, and a multi-layer including Co layers and Pd layers; and wherein the second magnetic recording layer includes a $L1_0$FePt layer.

19. The thermally assisted magnetic recording system according to claim 18, wherein the non-magnetic substance magnetically segregating the magnetic grains from one another comprises at least one element selected from the group consisting of Ag, Sn, Pb, Sb, and Bi.

20. The thermally assisted magnetic recording system according to claim 18, wherein the information recording medium further includes an FeMn layer or MnIr layer between the first magnetic recording layer and the second magnetic recording layer.

* * * * *